(12) United States Patent
Bastiaens et al.

(10) Patent No.: US 6,514,655 B2
(45) Date of Patent: Feb. 4, 2003

(54) GRAPHIC BASE CONSTRUCTION, RETROREFLECTIVE GRAPHIC ARTICLE MADE THEREFROM AND METHOD OF MAKING

(75) Inventors: Ann M. Bastiaens, Eagan, MN (US); Greg L. Breault, Hudson, WI (US); Douglas C. Degler, White Bear Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/943,176

(22) Filed: Aug. 30, 2001

(65) Prior Publication Data

US 2002/0096248 A1 Jul. 25, 2002

Related U.S. Application Data

(60) Provisional application No. 60/229,159, filed on Aug. 30, 2000.

(51) Int. Cl.⁷ ............................ B32B 27/14; B44C 1/00
(52) U.S. Cl. .................... 430/126; 428/195; 156/235
(58) Field of Search .................... 428/195; 156/235; 430/126

(56) References Cited

U.S. PATENT DOCUMENTS

| | | | |
|---|---|---|---|
| 4,919,994 A | 4/1990 | Incremona et al. | 428/141 |
| 5,045,391 A | 9/1991 | Brandt et al. | 428/336 |
| 5,085,918 A | 2/1992 | Rajan et al. | 428/195 |
| 5,106,710 A | 4/1992 | Wang et al. | 430/42 |
| 5,114,520 A | 5/1992 | Wang, Jr. et al. | 156/240 |
| 5,262,259 A | 11/1993 | Chou et al. | 430/47 |
| 5,344,705 A | 9/1994 | Olsen | 428/323 |
| 5,702,803 A | 12/1997 | Eisele et al. | 428/195 |
| 5,785,790 A * | 7/1998 | Olsen et al. | |
| 5,932,321 A | 8/1999 | Eisele et al. | 428/195 |
| 6,120,882 A * | 9/2000 | Faykish et al. | 428/195 |

FOREIGN PATENT DOCUMENTS

| | | |
|---|---|---|
| EP | 0 685 079 | 10/1997 |
| WO | WO 96/03285 | 2/1996 |
| WO | WO 96/24493 | 8/1996 |

* cited by examiner

Primary Examiner—John Goodrow
(74) Attorney, Agent, or Firm—Carolyn A. Fischer

(57) ABSTRACT

An electrographic process for making a base construction useful for making retroreflective graphic articles is provided.

24 Claims, 2 Drawing Sheets

GRAPHIC BASE CONSTRUCTION, RETROREFLECTIVE GRAPHIC ARTICLE MADE THEREFROM AND METHOD OF MAKING

RELATED APPLICATIONS

This application claims priority from U.S. provisional application serial No. 60/229,159 filed Aug. 30, 2000.

This invention relates to graphic articles and in particular retroreflective graphic articles and to methods for making the articles by electrographic printing means.

BACKGROUND OF THE INVENTION

A variety of print methods have been employed for imaging various sheet materials. Commonly employed print methods include gravure, off-set, flexographic, lithographic, electrographic (including electrostatic), electrophotographic (including laser printing and xerography), ion deposition (also referred to as electron beam imaging [EBI]), magnetographics, ink jet printing, screen printing and thermal mass transfer.

Electrostatic printing consists of an imaging step that involves direct deposition of electrostatic charge onto a surface that has been prepared to be printed followed by the toning step using liquid toners. This is followed by a step that involves fusing the toners with heat and/or pressure. Printers using this technology are available in wide widths up to 52 inches and are used for printing architectural drawings, billboards, etc. Thermal mass transfer printing uses computer-generated digital text and graphics data to drive a thermal printhead that melts spots of ink on doner ribbons and transfers them to a receiver. Systems in use have built-in computers and produce finished labels and other printed products with over 25% variable information in 4 colors laminated and either rotary or flat die-cut.

One of ordinary skill in the art appreciates the differences in these various print methods and recognizes that receptor sheets are typically not interchangeable such that high image quality results regardless of the printing method.

SUMMARY OF THE INVENTION

The present invention provides a method for making a base construction useful for making a retroreflective graphic article therefrom. Accordingly, the present invention in its first aspect is a method for making a base construction suitable for use in making a retroreflective article comprising the steps of electrographically printing an image on an image transfer sheet and contacting the image on the image transfer sheet to a base material under pressure and at an elevated temperature so that the image is transferred to a surface of the base material wherein the surface of the base material comprises a binder layer of polyvinyl butyral resin having glass microspheres enclosed therein and a specular reflective layer underlying and spaced apart from the microspheres by the resin.

A second aspect of the present invention further comprises the step of scanning an image to a computer to store the image in an electronic form wherein the stored image is electrographically printed on the image transfer sheet.

A third aspect of the present invention further comprises the step of applying a clear film to the surface of the base material having the transferred image thereon to provide a retroreflective graphic article.

In a fourth aspect of the invention, the retroreflective base material is affixed to a removable liner by a pressure sensitive adhesive layer and the printed image is applied to the side of the retroreflective base material opposite the side having the removable liner and adhesive layer. In a further aspect of the invention, the liner is removed from the pressure sensitive adhesive layer after forming a retroreflective article and the article is adhered to a substrate.

In another embodiment, the present invention is a method for making a retroreflective base construction comprising the steps of electrographically printing an image on an image transfer sheet and contacting the image on the image transfer sheet to a base material under pressure and at an elevated temperature so that the image is transferred to a surface of the base material wherein the surface of the base material comprises a binder layer selected from aliphatic polyurethane and polyurethane extended polyethylene terephthalate polymers having glass microspheres enclosed therein and a specular reflective layer underlying and spaced apart from the microspheres by the resin and applying a clear film to the surface of the base material having the transferred image.

In further aspects, the invention comprises the retroreflective base construction and retroreflective articles made according to the above described processes.

DETAILED DESCRIPTION OF THE DRAWINGS

Figure 1:
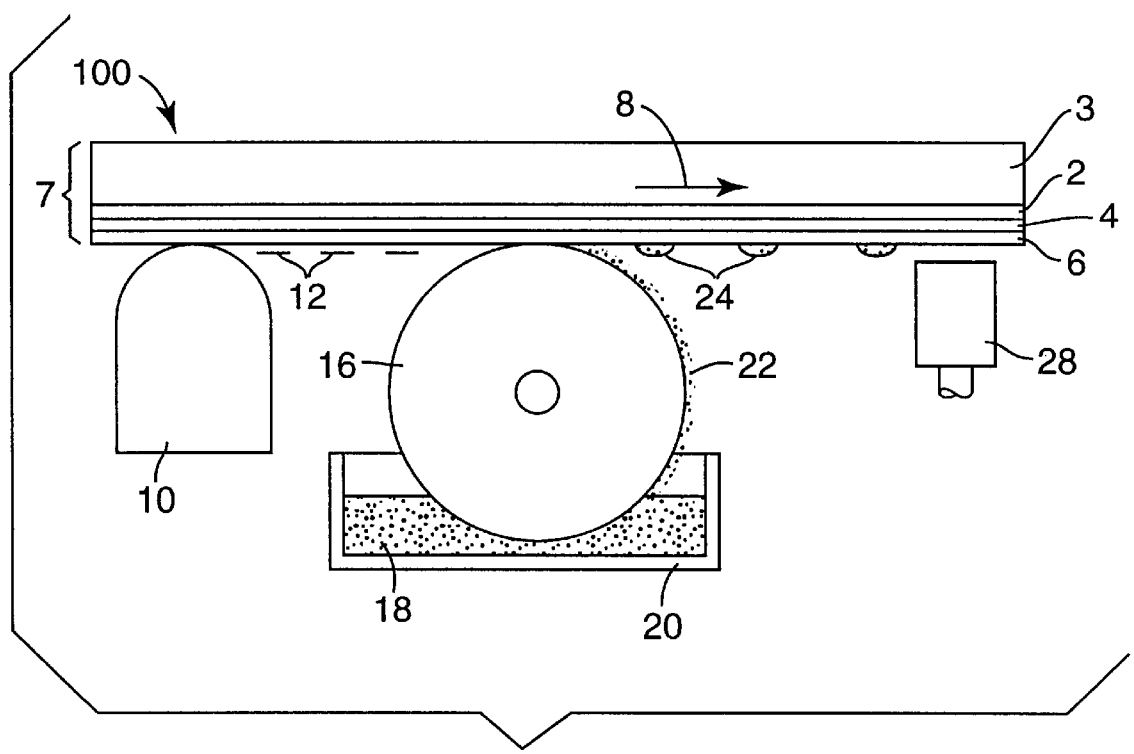
FIG. 1 is a diagrammatic representation one type of printing station useful in forming images to be transferred in accordance with the practice of the present invention.

FIG. 1 is a diagrammatic representation of a printer 100 of a type useful in the practice of the present invention. The printer 100 uses electrostatic means to form and develop a latent electrostatic image on an image transfer sheet 7 which may be a single sheet or a continuous web. The image transfer sheet 7 comprises a paper support base 3 having first a conductive layer 2 and then a dielectric layer 4. A release coating 6 may be applied to the dielectric layer 4 to facilitate transfer of an image. The surface of the image transfer sheet 7 having the release coating 6 proceeds in a direction 8 first passing a stylus writing head 10 which deposits a charge 12 having varying charge density to define a latent electrostatic image. After passing the writing head 10, the image transfer sheet 7 passes a toning station comprising a toner applicator 16 in contact with a liquid toner bath 18 in a container 20. The liquid toner comprises toner particles dispersed in an insulating liquid and are collectively referred to as the liquid toner bath 18. Liquid toner 22 is transported by the applicator 16 to the image transfer sheet 7 and deposited to form a toned image 24 conforming to the latent electrostatic image 12. The image 24 then passes a vacuum squeegee 28 where excess toner is removed. If a colored image is being replicated, for example, a four-color image comprising yellow, magenta, cyan and black toners, each toner is deposited imagewise in a separate step according to the process described above.

Figure 2:
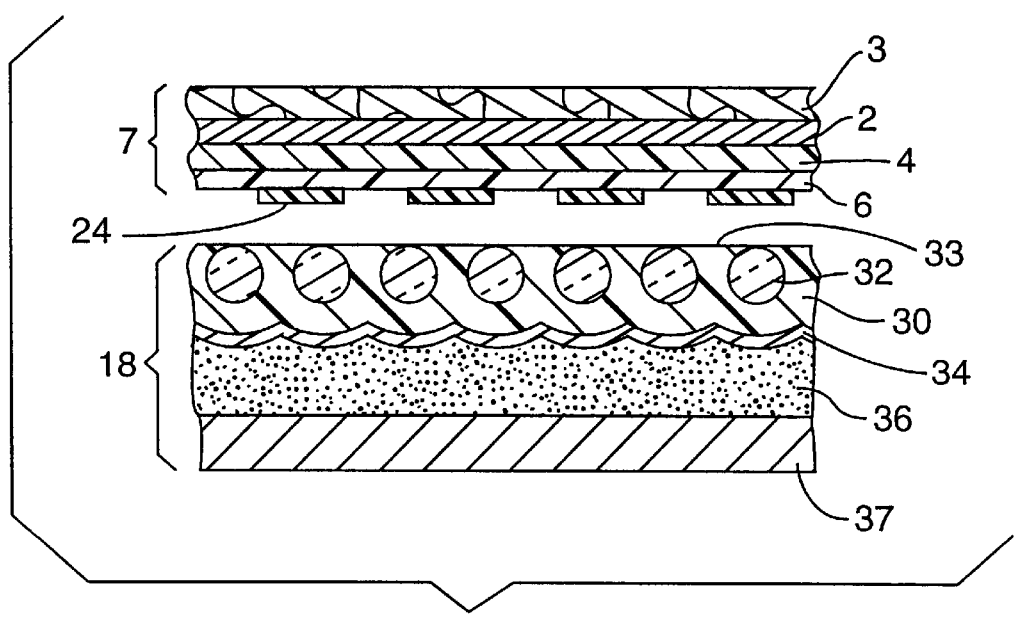
FIG. 2 is a cross-sectional view of a transfer sheet element having a graphic image positioned to transfer the image to a base material comprising glass microspheres.

FIG. 2 illustrates in cross section an image transfer sheet 7 having a toned electrostatic image 24 in juxtaposition to a receptor sheet 18 comprising base material in preparation for transferring the image 24 to the surface 33 of the receptor sheet 18. The receptor sheet 18 has a binder layer 30 containing substantially a monolayer of glass microspheres 32, a specular reflective layer 34 and a pressure sensitive adhesive layer 36 covered by an optional removable release liner 37. The binder layer 30 may be polyvinyl butyral, aliphatic polyurethane, urethane extended polyethylene terephthalate, and the like.

Figure 3:
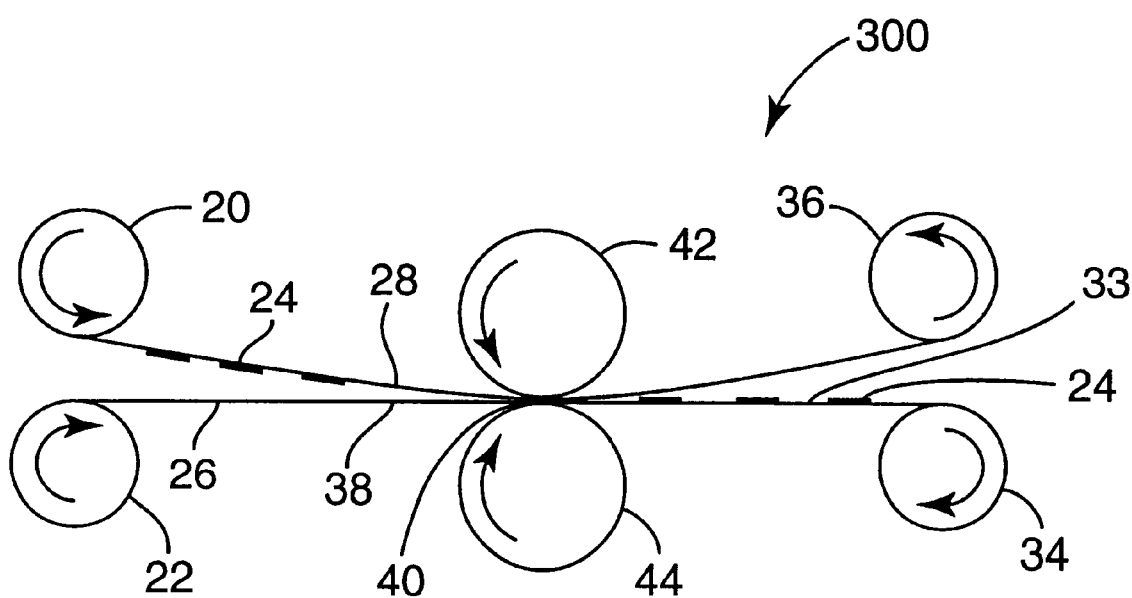
FIG. 3 is a diagrammatic representation of a transfer station for transferring an image from a transfer sheet element to a base material.

FIG. 3 is a diagrammatic representation of an image transfer station 300 wherein a toned image 24 formed on an image transfer sheet represented as a continuous web 28 is brought into contact with the surface 33 of the binder layer 30 of a receptor sheet also represented as a continuous web 38. The image transfer sheet continuous web 28 and receptor sheet continuous web 38 are supplied from feed rolls 20, 22. The image transfer sheet feed roll 20 may occur before or after the printer 100 represented in FIG. 1. The image transfer sheet web 28 and the receptor sheet web 38 pass through the nip 40 of rollers 42, 44 where heat and pressure are applied to transfer the toned image 24 from the image transfer sheet web 28 to the surface 33 of binder layer 30 of the receptor sheet web 38. The continuous webs 28, 38 are collected by pickup rolls 36, 34. The imaged receptor sheet provides a base construction suitable for making retroreflective articles.

Figure 4:
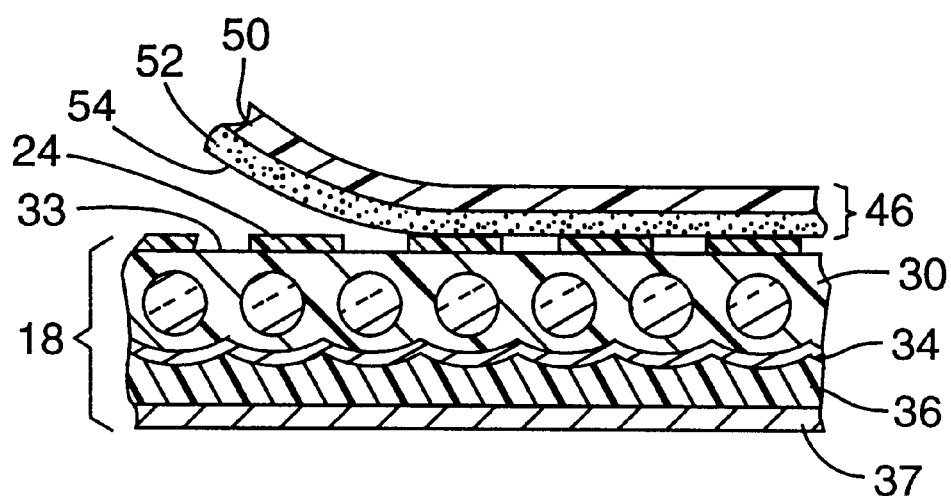
FIG. 4 is a cross sectional view of the application of an overlay element to the image containing surface of the base material comprising glass microspheres.

FIG. 4 illustrates a cross sectional view of the receptor sheet 18 having an image 24 on the surface 33 of the binder layer 30 and having a transparent cover film 46 applied to the image 24. The transparent cover film 46 comprises a transparent film 50 and a pressure sensitive adhesive layer 52. The transparent cover film 46 is typically applied to the image 24 by placing the surface 54 of the adhesive layer 52 in contact with the image 24 and passing the cover film 46 and imaged receptor sheet 18 through the nip of pressure rolls (not shown) to provide an imaged retroreflective article.

Well-known electrographic processes, and in particular electrostatic processes, may be used to produce images on an image transfer sheet. In these processes, a latent electrographic (e.g. electrostatic) image is formed on an accepting dielectric surface. The latent image on the dielectric substrate is then developed with suitable toner(s). The image may then be permanently adhered or "fixed" to the dielectric surface or transferred to another substrate such as a receptor sheet comprising a base material useful to make an imaged retroreflective article. Electrostatic printers suitable for carrying out the imaging process include, for example, the printer commercially available from Minnesota Mining and Manufacturing Company ("3M") under the trade designation "Scotchprint Printer 2000".

The image transfer sheet typically comprises a flexible substrate having a conductive layer in contact with and supporting a dielectric layer. The flexible substrate may be materials such as cellulose fiber based paper or polyester film. The conductive layer is required for the dielectric layer to accept an electrostatic charge and may be chosen from a variety of materials such as quaternary ammonium compounds or polymers containing a chloride anion salt. The imaging surface of the dielectric layer may also have a coating of a release layer to facilitate a toner transfer step in the electrostatic process. Representative image transfer sheets are described in U.S. Pat. Nos. 5,045,391 and 5,262,259. A suitable image transfer media is commercially available from 3M under the trade designation "Trident Transfer Paper ES" previously commercially available under the trade designation "Image Transfer Media 8601i (ES) ("8601i")".

Liquid toners for use in this invention may be selected from types known in the art. These toners comprise a stable dispersion of toner particles in an insulating carrier liquid. The toner particles are pigments coated with a resin and carry a charge. The requirements for suitable liquid toners are described in U.S. Pat. Nos. 4,946,753 and 5,262,259.

Suitable toners are commercially available from 3M under the trade designation "Scotchprint Exterior Four Color Toner Series 8700/8800".

The receptor sheet is a base material comprising glass microspheres that provide a low level of retroreflectivity. The glass microspheres are dispersed throughout the binder layer and are present substantially as a monolayer dispersed in the binder layer with an underlying specular reflective layer spaced from the microspheres by the transparent binder material. Suitable binder layer materials include polyvinyl butyral, aliphatic polyurethane and polyurethane extended polyethylene terephthalate (PET) polymers (e.g., described at column 15, lines 30–35 of U.S. Pat. No. 5,882,771). The specular reflective layer may be a vapor deposited aluminum film.

Reflective sheeting of the invention preferably has good cupping of the spacing layer between the microspheres and the specular reflective layer, thereby positioning a higher proportion of the specular reflective layer at a curved plane where light rays that pass through an individual microsphere are focused. Good cupping is generally achieved by greater penetration of the spacing layer between adjacent microspheres and also by the use of polymeric materials or solutions of appropriate viscosity or flow characteristics. Good cupping is indicated by measurements of microroughness on the back of the spacing layer or on the back of the specularly reflective layer coated on the spacing layer. Generally, in preferred sheeting of the invention this cupping is sufficient for microroughness readings of 125 microinches, arithmetic average, or more (about 3 micrometers or more) when measured on a Bendix portable Profilometer using a 2.5-micrometer-radius diamond stylus. The desired microroughn varies somewhat with the size of the microspheres and can be 5 or 10 percent higher for larger microspheres used in some reflective sheeting.

The image is transferred to the side of the base material closest to the microspheres and opposite the reflective layer. The surface of the receptor sheet receiving the image does not require preliminary treatment for satisfactory transfer to occur. A pressure sensitive adhesive layer may be applied to the side of the retroreflective base material adjacent to the reflective layer. A suitable pressure sensitive adhesive is described, for example, in U.S. Pat. No. 6,197,397. The adhesive may have a removable release liner to facilitate handling, such as that described in U.S. Pat. No. 5,897,930. Retroreflective base material and in particular enclosed-lens type retroreflective sheeting is described in U.S. Pat. No. 4,767,659. Suitable retroreflective base materials are commercially available from 3M under the trade designations "Scotchlite Changeable Graphic Film 5100 (ES) ("Scotchlite 5100 (ES)") and "Scotchlite Reflective License Plate Sheeting Series 3750/3770".

The imaged receptor sheet provides a base construction suitable for forming a retroreflective article. Although the base construction alone typically provides low levels of retroreflection, a clear film is preferably applied as an overlay to the image enhancing the retroreflection (i.e. luminance, brightness) as compared to the base material without the clear film.

After applying the clear film, the brightness of the imaged retroreflective article, as measured at 0.2° divergence angle and −4° entrance angle according to ASTM E-810 is typically at least about 20 candellas per lux per square meter and preferably at least about 40 candellas per lux per square meter. For end uses in which enhanced retroreflection is desired the brightness is more preferably at least about 60 candellas per lux per square meter and most preferably at least about 80 candellas per lux per square meter The clear films are typically comprised of thermoplastic materials such as polyvinyl chloride or polyolefin. The film may be affixed to the base construction by a pressure sensitive adhesive or by lamination (e.g. thermal). Suitable clear film overlay material is commercially available from 3M under the trade designation "Scotchcal Electrostatic Protective Clear-Luster 8910 (ES)" and "Scotchcal Electrostatic Protective Overlaminate 8908 (ES)". The clear film layer may also be provided as a topcoat. The topcoat may be applied as a liquid by screen printing methods, for example, using a product commercially available from 3M under the trade designation "Screen Printing 1920 Clear Coat". The clear film and liquid topcoat may optionally contain ultraviolet light absorbing agents. A suitable ultraviolet light curable liquid for use as a topcoat may be, for example, that described in WO 00/58930. Another suitable topcoat is commercially available from 3M under the trade designation "Screen Printing Overprint Clear 9720UV"

The retroreflective article made from the base construction comprising glass microspheres and having a pressure sensitive adhesive layer may be adhered to a substrate. The substrate may be any material suitable for signage or graphic advertising such as aluminum, steel, glass, wood (e.g. painted wood), poster board and the like.

The article is suitable for use as traffic signage, roll-up signs, flags, banners and other articles including other traffic warning items such as roll-up sheeting, cone wrap sheeting, post wrap sheeting, barrel wrap sheeting, license plate sheeting, barricade sheeting and sign sheeting; vehicle markings and segmented vehicle markings; pavement marking tapes and sheeting; as well as retroreflective tapes. The article is also useful in a wide variety of retroreflective safety devices including articles of clothing, construction work zone vests, life jackets, rainwear, logos, patches, promotional items, luggage, briefcases, book bags, backpacks, rafts, canes, umbrellas, animal collars, truck markings, trailer covers and curtains, etc.

Commercial graphic films include a variety of advertising, promotional, and corporate identity imaged films. The films typically comprise a pressure sensitive adhesive on the non-viewing surface in order that the films can be adhered to a target surface such as an automobile, truck, airplane, billboard, building, awning, window, floor, etc. Alternatively, imaged films lacking an adhesive are suitable for use as a banner, etc. that may be mechanically attached to building, for example, in order to display. The films in combination with any associated adhesive and/or line range in thickness from about 5 mils (0.127 mm) to as thick as can be accommodate by the printer (e.g. ink jet printer).

The complete disclosure of all patents, patent documents and publications are incorporated herein by reference as if individually incorporated. Various modifications and alterations of this invention will become apparent to those skilled in the art without departing from the scope and spirit of this invention.

EXAMPLES

Objects and advantages of the invention are further illustrated by the following examples, but the particular materials and amounts thereof recited in the examples, as well as other conditions and details, should not be construed to unduly limit the invention.

Test Methods Used in the Examples
Quality of Image Transfer ("QIT")

Both the transferred image on the retroreflective base construction (either with an overlaminate or without an overlaminate) and the transfer media were visually evaluated for Quality of Image Transfer from the transfer media to the Scotchlite 5100 ES film base construction. The QIT was rated as "Acceptable ("A")" if the image transfer media was clear with no image remaining on the transfer media, although some shadow may remain when dark colors were used. The QIT was rated as "Unacceptable ("U")" if any portion (other than some shadow) of the image remained on the image transfer media.

Adhesion of the Overlaminate ("AO")

Adhesion of the Overlaminate was determined by peel force measurements performed on samples of imaged Scotchlite 5100 ES film base construction of about 2.5 cm wide by about 15 cm long. Each film base construction was adhered to a 7 cm wide by 28 cm long aluminum panel (6061T6 alloy with etch and desmut surface from Q Panel Company, Cleveland, Ohio) using double sided adhesive tape. The exposed adhesive of the double sided tape was placed on the aluminum panel and laminated to the panel by running a rubber coated, 5 cm wide roller back and forth along the length of the adhesive strip twice using hand pressure. The release liners were removed from the double-sided tape and the imaged Scotchlite 5100 ES film base construction. The adhesive side of the imaged Scotchlite 5100 ES film base construction was laminated to the double-sided tape on the test panel using a rubber roller as detailed above. A strip of about 2.5 cm wide by about 40 cm long of reinforcing tape commercially available from 3M under the trade designation "Scotch Superior Performance Filament Tape" was aligned with one edge of the imaged Scotchlite 5100 ES film base construction and laminated to the film side (i.e. overlaminate) of the base construction on the test panel using a rubber roller as detailed above. The reinforcing tape extending beyond the base construction was folded back on itself adhesive to adhesive to reinforce the overlaminate and provide a tab for peeling the overlaminate from the imaged film base construction. A sharp razor blade was used to carefully start peeling the overlaminate away from the Scotchlite 5100 ES film base construction.

The aluminum panel was clamped in the lower jaw of a tensile testing apparatus commercially available from MTS, Eden Prairie, Minn. under the trade designation "Sintech 1". The filament tape tab was clamped in the upper jaw of the tensile testing apparatus. The overlaminate was separated from the Scotchlite 5100ES film base construction at ambient temperature and at a 180° angle using a crosshead speed of 30 cm/minute. The peel force was recorded in grams/cm over a length of at least 10 cm and the average peel force was obtained for 3 replicates.

Brightness

Brightness of the imaged retroreflective article was measured at 0.2° divergence angle and −4° entrance angle according to ASTM E-810. Three measurements were taken and the average reported in candellas per lux per square meter.

Tensile and Elongation

The tensile strength and total elongation were measured according to ASTM Test Method D882-80a.

Examples 1–4

Example 1 was prepared by printing a four color graphic test image of 122 cm in width and about 4.5 meters in length on 137 cm (54 inch) wide image transfer media 8601i using a Scotchprint Printer 2000. The test image on the image transfer media was then transferred to Scotchlite 5100 ES film base construction using a hot roll laminator commercially available from 3M under the trade designation "GBC Pro-Tech Orca III (M9542)". The top roll temperature was set at 143° C. (290° F.), the bottom roll temperature was set at 27° C. (80° F.), roll pressure was set at 6.3 kg/cm$^2$ (90 psi) and the transfer speed was 1.2 meters/second (4 feet/minute).

An overlaminate was immediately applied in line to the imaged Scotchlite 5100 ES film base construction using the conditions set out above for transfer of the image. The 124 cm (49 inches) wide overlaminate used was Scotchcal Electrostatic Protective Overlaminate 8908 (ES).

Example 2 was prepared as described for Example 1, except the overlaminate used was Scotchcal Electrostatic Protective Clear-Luster 8910 (ES).

Example 3 was prepared by printing a four color graphic test image of 122 cm in width and about 4.5 meters in length on 137 cm wide image transfer media 8601i using a Scotchprint Printer 2000. The test image on the image transfer media was then transferred to a 20.3 cm (8 inch)×27.9 cm (11 inch) base construction described at Column 3, lines 49 through Column 5, line 21 of Example 1 of U.S. Pat. No. 4,950,525 using the hot roll laminator and the conditions described in Example 1, except at a transfer speed of 0.6 meters/minute.

Example 4 was prepared by printing a four color graphic test image of 122 cm in width and about 4.5 meters in length on 137 cm wide image transfer media 8601i using a Scotchprint Printer 2000. The test image on the image transfer media was then transferred to a retroreflective base construction which consisted of the construction described in Example 1 of U.S. Pat. No. 4,663,213 with the following exceptions: Transparent Cover Film A was not utilized; in (1) urethane extended PET, as described in column 15, lines 30–35 of U.S. Pat. No. 5,882,771, was used instead of thermoset polyvinyl butyral and plasticizer; (2) liner saturated polyester, as described in Table 5, sample 11 of U.S. Pat. No. 5,008,142, was used as the spacing layer and (3), (4) and (5) were not utilized. The test image on the image transfer media was transferred to the prepared PET containing retroreflective base construction using the hot roll laminator and conditions described in Example 3, except at a transfer speed of 0.3 m/minute.

Set out below in the TABLE are the tensile, elongation, adhesion of the overlaminate, brightness and quality of image transfer of the articles of Examples 1–4.

The data in the TABLE show that for all the examples, the Quality of Image Transfer was Acceptable. For Examples 1 and 2, the additional properties measured showed that an excellent graphic base construction was prepared.

TABLE

| Ex. No. | Tensile (MPa) | Elongation (%) | AO (g/cm) | Brightness (cd/l/m$^2$) | QIT |
|---|---|---|---|---|---|
| 1 | 6.8 | 168 | 804 | 75.5 | A |
| 2 | 7.8 | 97 | 1572 | 76 | A |
| 3 | NM* | NM | NM | NM | A |
| 4 | NM | NM | NM | NM | A |

*NM = Not measured.

The above specification provides a complete description of the manufacture and use of the retroreflective base constructions and retroreflective articles of the invention. Since many embodiments of the invention can be made without departing from the spirit and scope of the invention, the invention resides in the claims hereinafter appended.

We claim:

1. A method for making a base construction for a retroreflective article comprising the steps:
   a. electrographically printing an image on an image transfer sheet; and
   b. contacting the image on the image transfer sheet to a receptor sheet under pressure and at an elevated temperature so that the image is transferred to a surface of the receptor sheet wherein the receptor sheet surface comprises a binder layer of polyvinyl butyral resin having glass microspheres enclosed therein and a specular reflective layer underlying and spaced apart from the microspheres by the resin.

2. The method of claim 1 comprising the step of scanning an image to a computer to store the image in an electronic form wherein the stored image is electrographically printed on the image transfer sheet.

3. The method of claim 1 further comprising the step of applying a clear film to the surface of the receptor sheet having the transferred image.

4. The method of claim 1 wherein the printing step comprises creating a latent electrographic image on the image transfer sheet and developing the image with liquid toner to produce a visible image.

5. The method of claim 4 wherein the visible image is a four color image.

6. The method of claim 1 wherein the receptor sheet is affixed to a removable liner by a pressure sensitive adhesive layer and the printed image is applied to the side of the receptor sheet opposite the side having the removable liner and adhesive layer.

7. The method of claim 3 wherein the clear film is adhered to the receptor sheet by a pressure sensitive adhesive.

8. The method of claim 6 wherein the liner is removed from the pressure sensitive adhesive layer and the receptor sheet is adhered to a substrate.

9. The method of claim 1 wherein the base construction has a microroughness reading of at least 125 microinches.

10. A construction for a graphic article made according to claim 1.

11. A graphic article made according to claim 3.

12. A graphic article made according to claim 8.

13. A method for making a retroreflective base construction for a retroreflective article comprising the steps:
   a. electrographically printing an image on an image transfer sheet; and
   b. contacting the image on the image transfer sheet to a receptor sheet under pressure and at an elevated temperature so that the image is transferred to a surface of the receptor sheet wherein the receptor sheet surface comprises a binder layer selected from aliphatic polyurethane and polyurethane extended polyethylene terephthalate polymers having glass microspheres enclosed therein and a specular reflective layer underlying and spaced apart from the microspheres by the resin and applying a clear film to the surface of the receptor sheet having the transferred image thereon to provide a retroreflective graphic article.

14. The method of claim 13 comprising the step of scanning an image to a computer to store the image in an electronic form wherein the stored image is electrographically printed on the image transfer sheet.

15. The method of claim 13 wherein the printing step comprises creating a latent electrographic image on the image transfer sheet and developing the image with liquid toner to produce a visible image.

16. The method of claim 15 wherein the visible image is a four color image.

17. The method of claim 13 wherein the receptor sheet is affixed to a removable liner by a pressure sensitive adhesive layer and the printed image is applied to the side of the receptor sheet opposite the side having the removable liner and adhesive layer.

18. The method of claim 13 wherein the clear film is adhered to the receptor sheet by a pressure sensitive adhesive.

19. The method of claim 17 wherein the liner is removed from the pressure sensitive adhesive layer and the receptor sheet is adhered to a substrate.

20. The method of claim 12 wherein the base construction has a microroughness reading of at least 125 microinches.

21. A retroreflective base construction for a graphic article made according to claim 12.

22. A retroreflective graphic article made according to claim 19.

23. The method of claim 1 wherein step (a) employs electrostatically printing.

24. The method of claim 12 wherein step (a) employs electrostatically printing.

* * * * *

UNITED STATES PATENT AND TRADEMARK OFFICE
CERTIFICATE OF CORRECTION

PATENT NO. : 6,514,655 B2
DATED : February 4, 2003
INVENTOR(S) : Bastiaens, Ann M.

It is certified that error appears in the above-identified patent and that said Letters Patent is hereby corrected as shown below:

Column 1,
Line 31, delete "doner" and insert in place thereof -- donor --.

Column 2,
Line 24, insert -- of -- preceding "one".

Column 4,
Line 32, delete "microroughn" and insert in place thereof -- microroughness --.
Line 65, insert -- . -- following "meter".

Column 5,
Line 15, insert -- . -- following """.
Line 42, insert -- a following "to".
Line 45, delete "accommodate" and insert in place thereof -- accommodated --.

Signed and Sealed this

Fourteenth Day of October, 2003

JAMES E. ROGAN
*Director of the United States Patent and Trademark Office*